United States Patent [19]

Goswami

[11] 4,078,130

[45] Mar. 7, 1978

[54] POLYVINYL HALIDE-BIS(HYDROCARBYL) VINYLPHOSPHONATE COPOLYMERS CROSSLINKED WITH AMINES

[75] Inventor: Jagadish C. Goswami, New City, N.Y.

[73] Assignee: Stauffer Chemical Company, Westport, Conn.

[21] Appl. No.: 724,122

[22] Filed: Sep. 17, 1976

Related U.S. Application Data

[63] Continuation of Ser. No. 582,463, May 30, 1975, abandoned.

[51] Int. Cl.² ............... C08F 14/02; C09C 19/22; C08F 30/02
[52] U.S. Cl. .............................. 526/17; 526/18; 526/49; 526/278; 260/2.5 R; 260/2.5 FP
[58] Field of Search .............. 526/278, 17, 18, 49

[56] References Cited

U.S. PATENT DOCUMENTS

| | | | |
|---|---|---|---|
| 3,300,425 | 1/1967 | Nagelschmidt et al. | 526/278 |
| 3,489,706 | 1/1970 | Mikofaluy | 526/278 |
| 3,725,359 | 4/1973 | Goswami | 526/278 |
| 3,726,839 | 4/1973 | Jin | 526/278 |
| 3,792,113 | 2/1974 | Goswami et al. | 526/278 |
| 3,842,048 | 10/1974 | Jin | 526/278 |

FOREIGN PATENT DOCUMENTS

| | | | |
|---|---|---|---|
| 964,350 | 7/1964 | United Kingdom | 526/17 |

*Primary Examiner*—Herbert J. Lilling
*Attorney, Agent, or Firm*—Richard P. Fennelly

[57] ABSTRACT

Polyvinyl halide-bis(hydrocarbyl) vinylphosphonate films and foams are crosslinked by the use of amine crosslinking agents to form products having good dimensional stability for use as cushioning materials, as insulator materials and for structural applications.

15 Claims, No Drawings

POLYVINYL HALIDE-BIS(HYDROCARBYL) VINYLPHOSPHONATE COPOLYMERS CROSSLINKED WITH AMINES

This is a continuation, division, of application Ser. No. 582,463, and now abandoned.

TECHNICAL DESCRIPTION OF THE INVENTION

The present invention is directed to the formation of crosslinked polyvinyl halide-bis(hydrocarbyl) vinylphosphonate films and foams which can find use as cushioning materials, as insulator materials, and for structural applications.

Basically, the present invention contemplates the initial formation of a polyvinyl halide-bis(hydrocarbyl) vinylphosphonate copolymer, which is similar to some of the copolymers formed in U.S. Pat. Nos. 3,725,359 and 3,792,113 to J. C. Goswami et al., which are incorporated herein by reference, followed by the crosslinking of said copolymer by heating it in the presence of at least one suitable amine crosslinking agent. The use of such a crosslinking agent obviates the need for use of a polyethylenically unsaturated crosslinking monomer, as described in U.S. Pat. No. 3,842,048 to Jung Il Jin, when a crosslinked vinyl halide-vinylphosphonate composition is desired.

The vinyl halide which is to be used in the present invention is preferably either vinyl chloride or bromide or mixtures thereof. It is present in an amount ranging from about 50% to about 90% by weight based on the weight of the bis(hydrocarbyl) vinylphosphonate-vinyl halide copolymer.

The bis(hydrocarbyl) vinylphosphonate can be any one of the vinylphosphonate used in the above enumerated patents. It has the structure

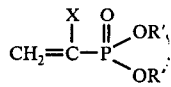

where X is either hydrogen, halogen, cyano, aryl, haloaryl, $C_1$-$C_{18}$ alkyl, $C_1$-$C_{18}$ haloalkyl or

where R and R' are hydrocarbyl and substituted hydrocarbyl groups consisting essentially of hydrogen and carbon and containing up to about 18 carbon atoms, with the proviso that R and R' may be the same, different or conjoint. The hydrocarbyl group can be either aliphatic or aromatic and can contain such substituents as chloro, bromo, fluoro, nitro, hydroxy, sulfone, ethoxy, methoxy, nitrile, ether, ester and keto groups. Representative R groups are the alkyl groups, such as methyl, ethyl and propyl, the alkenyl groups, such as pentenyl and hexenyl, the cycloalkyl groups, and such typical aryl groups as phenyl, benzyl, tolyl and naphthyl.

The preferred vinylphosphonate is bis(beta-chloroethyl) vinylphosphonate although the other specifically named vinylphosphonates in the above enumerated patents can be used as well. If desired, minor amounts, i.e., up to about 5%, of mono(alkyl) acid vinylphosphonates, of mono (cycloalkyl) and mono(cycloaryl) hydrogen vinylphosphonates, of bis(cycloalkyl) and bis(aryl) vinylphosphonates, and of bis(alkyl), bis(cycloalkyl) and bis(aryl) allylphosphonates can be present as well.

The copolymers of the vinyl halide-bis(hydrocarbyl) vinylphosphonates can be prepared by means of any of the conventional free radical initiated polymerization procedures known to those of skill in the art including such procedures as suspension, emulsion and solution polymerization. Emulsion polymerization is preferred.

In suspension polymerization the reaction is preferably conducted in an aqueous medium containing about 0.01% to 5.0%, by weight, of a monomer soluble, e.g., azo or peroxide, catalyst. The reaction temperature is maintained at 20°–120° C. for about 5 to about 48 hours.

In emulsion polymerization the reaction is preferably conducted using 0.01% to 5% of an anionic, nonionic or cationic emulsifier and 0.01% to 5% by weight of a water-soluble, free radical initiating catalyst, e.g., a persulfate catalyst, or a redox system, e.g., a mixture of a persulfate with a bisulfite, thiosulfite or hydrosulfite. The polymerization temperatures and times are the same as described above for suspension polymerization.

In solution polymerization the monomers are first dissovled in a suitable organic solvent, and the solution is heated with the types of catalyst used in suspension polymerization for the same time under the same general temperature conditions.

When the vinyl halide-bis(hydrocarbyl) vinylphosphonate copolymers are obtained they are ready for fabrication into either a foamable or non-foamable film containing any of the amine crosslinking agents which are to be used with the present invention. They are generally mixed with an appropriate amount of the crosslinking agent, as will be described in greater detail below, from about 25% to about 75% by weight of a conventional plasticizer, and lesser amounts of any functional additives, such as antioxidants, stabilizers, pigments, etc. If a blown foam is the intended end product, about 1% to 15% by weight of a conventional blowing agent is needed.

The amine crosslinking agents which can be used herein include the monoalkyl, dialkyl and trialkyl monoamines, the trialkyl diamines, $NR_3N$, the dialkyl diamines, $HNR_2NH$, the alkyl diamines, $H_2NRNH_2$, the dialkyl triamines, $NH_2R'NHR''NH_2$, where R' + R'' = R, and aliphatic amines having a cyclic chain of from four to six carbon atoms. The alkyl group R in the above formulae is preferably $C_2$-$C_{14}$. The cyclic amines can have heteroatoms such as oxygen contained therein, for example, as in the N-alkyl morpholines. Other cyclic amines which can be used include pyridine and N, N-dialkyl cyclohexyl amine. The above amines are relatively non-volatile and will not be driven off by the heat generated during processing. Examples of suitable amines are triethylamine, di-n-propylamine, tri-n-propylamine, n-butyl amine, cyclohexyl amine, triethylenediamine, ethylene diamine, propylene, diamine, hexamethylene diamine, N, N-diethyl cyclohexyl amine and pyridine. If desired, the amines can be dissolved in a suitable solvent. For example, triethylene diamine, can be dissolved in polyhydroxy tertiary amines, such as triethanol amine, and this is the preferred mode of carrying out the claimed invention. From about 0.5% to about 10% of the amine should be used based on the weight of the vinyl halide-vinylphosphonate copolymer. Aromatic amines should not be used since they are toxic and often produce discoloration of the crosslinked product.

If a foam is the ultimate end product the composition will contain a blowing agent which is suitable for use with vinyl compounds. Examples are benzene sulfonyl hydrazide, toluene sulfonyl hydrazide, 4,4'-oxybis(benzene sulfonyl hydrazide) and azodicarbonamide. This composition is foamed by heating to the appropriate temperature, e.g., at 350° F. for 5 min. when 4,4'-oxybis(benzene sulfonyl hydrazide) is used, prior to the crosslinking step which will be described below.

After appropriate processing using conventional procedures, and blowing, if such is to be done, the copolymer-containing composition is then heated to a temperature of from about 160° C. to about 180° C. for about 3 min. to about 10 min. to enable the crosslinking amine to crosslink the vinyl halide-vinylphosphonate copolymer.

The following Examples illustrate certain preferred embodiments of the present invention:

EXAMPLE 1

Two hundred ninety grams of water, 15 g of a 2% potassium persulfate solution, 15g of 1% $NaHCO_3$, 0.85g of trichloroethylene (TCE), 21g of the bis(tridecyl) ester of sodium sulfosuccinic acid (Aerosol TR, sold by American Cyanamid Co.), 10.5 grams of bis(-beta-chloroethyl) vinylphosphonate, and 121 grams of vinyl chloride were charged into a reactor, heated at 51° C. for 6¾ hours and produced an emulsion having a solids content of 27.8% and a latex particle size of 0.15–1.05 microns.

Sixty-eight grams of the latex described above was charged into a reactor with 21g of Aerosol TR, 15g of 2% potassium persulfate, 15g of 1% $NaHCO_3$, 0.65 grams of trichloroethylene, 290 grams of $H_2O$, 10.5g of bis(beta-chloroethyl) vinylphosphonate, and 120 grams of vinyl chloride. It was heated to 51° C for 5 hours 50 minutes.

This latex is then ground in a Waring blender. To 500g of this ground sample was added 0.9% sorbitan monolaurate, 0.9% of polyoxyethylene sorbitan monolaurate (Tween 21), 0.135% of sodium lauryl sulfate, and 0.045% 2,6,-di-t-butyl-p-cresol (Ionol) in 500 ml. of isopropanol. The isopropanol was evaporated, and the residue was reground for use in Example II.

EXAMPLE II

This Example compares the crosslinking ability of foamable compositions based on polyvinyl chloride dispersion resin (SCC-20 available from Stauffer Chemical Co.) and a 92/8% by weight vinyl chloride/bis(-beta-chloroethyl) vinylphosphonate emulsion resin formed by the process described in Example I. The data (as measured by the solubility in tetrahydrofuran for 24 hours) show that formulations based on the vinyl chloride-vinylphosphonate resin are unique in the sense that these compositions readily undergo crosslinking in the presence of crosslinking agent, e.g., triethylenediamine.

TABLE I

| | Formulation | | |
|---|---|---|---|
| | A | B | C |
| | (parts by weight) | | |
| PVC dispersion resin | 100 | 100 | 0 |
| 92/8 vinyl chloride-vinylphosphonate | 0 | 0 | 100 |
| Dioctyl phthalate | 70 | 70 | 75 |
| $CaCO_3$ (Atomite,Thompson, Weinman & Co.) | 10 | 10 | 10 |
| $TiO_2$ | 2 | 2 | 2 |
| Azodicarbonamide | 4 | 4 | 4 |
| Triethylenediamine | 0 | 2 | 2 |
| Liquid Zn Stabilizer (ABC-2,Carlisle Chemical) | 2 | 2 | 2 |

The foaming conditions for all of the above was exposure to a temperature of 350° F. (177° C.) for about 5 minutes. All were then post cured at 350° F. for the following lengths of time:

| Formulation | Time of Post cure (min.) | Degree of Crosslinking |
|---|---|---|
| A | 30 | None |
| B | 15 | None |
| C | 3 | Extensive |

EXAMPLE III

This illustrates the crosslinking ability of flexible formulations based on a 90/10 vinyl chloride-bis(beta chloroethyl) vinylphosphonate copolymer as compared with polyvinyl chloride suspension homopolymer (available as SCC-686 from Stauffer Chemical Co.) and a 96/4 vinyl chloride-propylene suspension copolymer (available as SCC-300B from Stauffer Chemical Co.). The data show that the vinyl chloride-vinylphosphonate copolymer under goes ready crosslinking and that the best crosslinking is obtained using an amine as crosslinking agent.

A pre-reaction mixture was formed from the following ingredients:

| Reagent | Amount (parts by weight) |
|---|---|
| Dioctyl phthalate | 40 |
| Butyl benzyl phthalate (Santicizer 160, Monsanto Co.) | 15 |
| Epoxidized Soybean Oil | 5 |
| $CaCO_3$ (Atomite) | 10 |
| $TiO_2$ | 2 |
| Liquid Zn Stabilizer (ABC-2) | 3 |
| Acrylic Process Aid (K-175, Rohm & Haas) | 2 |
| Polyethylene Wax | 2 |
| 4,4'-oxybis (benzene suffonyl hydrazide) (Celogen OT, Uniroyal, Inc.) | 8 |

To this were added 100 parts by weight of each of the above mentioned copolymers as well as varying amounts of certain crosslinking agents. All foams were made by blowing the resulting mixtures at 320° F. (160° C.) for about 7 minutes followed by postcuring for various periods of time. The Table set forth below gives the results:

TABLE

| Copolymer | Crosslinking Agent | Amount (phr)* | Post Cure Time (min.) | Degree of Crosslinking |
|---|---|---|---|---|
| Vinyl chloride Suspension resin | none | — | 15 | none |
| " | Methyl ethyl ketone peroxide | | | |

TABLE-continued

| Copolymer | Crosslinking Agent | Amount (phr)* | Post Cure Time (min.) | Degree of Crosslinking |
|---|---|---|---|---|
|  | (MEKP) | 5 | 15 | none |
| " | Triethylenediamine (TEDA) | 2 | 15 | none |
| Vinyl chloride/ propylene | none | — | 15 | none |
| " | MEKP | 5 | 15 | none |
| " | TEDA | 2 | 15 | none |
| Vinyl chloride/ vinylphosphonate | none | — | 10 | none |
| " | MEKP | 5 | 10 | slight |
| " | TEDA | 2 | 3 | extensive |

*based upon the weight of copolymer resin

EXAMPLE IV

The following shows use of triethylenediamine in crosslinking a formulation containing a 90/10 vinyl chloride-bis(beta chloroethyl) vinylphosphonate copolymer:

| Reagent | Parts by weight | |
|---|---|---|
|  | A | B |
| 90/10 vinyl chloride-vinylphosphonate | 100 | 100 |
| $CaCO_3$ (Atomite) | 10 | 10 |
| $TiO_2$ | 2 | 2 |
| Acrylic Process Aid (K-120N, Rohm & Haas) | 1.5 | 1.5 |
| Acrylic Process Aid (K-175, Rohm & Haas) | 1.0 | 1.0 |
| Gycerol Monostearate (Aldo MS, Glyco Chemicals Inc.) | 1.0 | 1.0 |
| Partially saponified ester wax | 1.0 | 1.0 |
| Tin stabilizer (T-31, M&T Chemicals) | 3.0 | 3.0 |
| Triethylenediamine | 1.0 | 0 |

Each of the above were milled at 315°–320° F (157°–160° C.) using a 1.4 shear ratio and were pressed at 350° F. for 7 minutes. "A" showed crosslinking whereas "B" showed none.

EXAMPLE V

This shows how certain physical properties are improved due to crosslinking:

| Reagent | Amount (parts by weight) | |
|---|---|---|
|  | A | B |
| 90/10 vinyl chloride-vinyl-phosphonate copolymer | 100 | 100 |
| Dioctyl phthalate | 60 | 60 |
| $CaCO_3$ (Atomite) | 10 | 10 |
| $TiO_2$ | 2 | 2 |
| Polyethylene Wax | 2 | 2 |
| Acrylic Process Aid (K-120N, Rohm & Haas) | 2 | 2 |
| Acrylic Process Aid (K-175, Rohm & Haas) | 2 | 2 |
| Tin Stabilizer (T-31, M&T Chemicals) | 3 | 3 |
| Triethylenediamine | 2 | 2 |

Each of the above was milled at 285°–290° F (140.5°–143° C.) at a shear ratio of 1.4. "B" was cured at 350° F for 5 minutes to crosslink the formulation. "A" was not cured and had no crosslinking. The following physical properties were noted:

|  | A | B |
|---|---|---|
| Tensile str. at break (psi) | 1656 | 2028 |
| Secant modulus at 100% elongation (psi) | 754 | 817 |
| % elongation at break | 241 | 281 |

EXAMPLE VI

The indent load deflection (I.L.D.) as measured by ASTM D1546, Method A, was determined for a series of foams:

| Reagent | Foam Formulation | | |
|---|---|---|---|
|  | A | B | C |
|  | (parts by weight) | | |
| 90/10 vinyl chloride-vinylphosphonate | 100 | 100 | 100 |
| Dioctyl phthalate | 40 | 40 | 40 |
| butyl benzyl phthalate | 15 | 15 | 15 |
| Plasticizer (Paraplex G-62) | 5 | 5 | 5 |
| $CaCO_3$ (Atomite) | 10 | 10 | 10 |
| $TiO_2$ (RA-40) | 2 | 2 | 2 |
| Liq. Zn Stabilizer (ABC-2) | 3 | 3 | 3 |
| Acrylic Process Aid (K-175) | 2 | 2 | 2 |
| 4,4'-oxybis(benzene sulfonyl hydrazide)-Celogen OT | 8 | 8 | 8 |
| Triethylenediamine | 2 | 0 | 0 |
| Methyl ethyl ketone peroxide | 0 | 5 | 0 |

All were milled at 250°–255° F. (121°–124° C.) and compression molded at 280° F. (138° C.). Blowing and curing each occurred at 350° F. for five minutes. Only formulation A was crosslinked.

The following I.L.D. values (in lbs./in.$^2$) were noted:

|  | A | B | C |
|---|---|---|---|
| I.L.D. at 25% | 17.5 | 13 | 14.6 |
| I.L.D. at 65% | 166 | 92 | 107 |

The above Examples are provided to illustrate certain preferred embodiments of the claimed invention. The appended claims recite the scope of protection that is desired.

What is claimed is:

1. A crosslinked copolymer which consists essentially of:
   (1) a vinyl halide; and
   (2) a bis(hydrocarbyl)vinylphosphonate having the structure

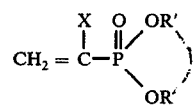

wherein X is selected from the group consisting of hydrogen, halogen, cyano, aryl, haloaryl, $C_1$-$C_{18}$ alkyl, $C_1$-$C_{18}$ haloalkyl and

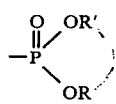

wherein R and R' are hydrocarbyl and substituted hydrocarbyl groups consisting essentially of hydrogen and carbon and containing up to about 18 carbon atoms, inclusive, with the proviso that R and R' may be the same, different or conjoint, said crosslinked copolymer being formed in the absence of a polyethylenically unsaturated crosslinking monomer by heating a copolymer of the vinyl halide and the vinylphosphonate in the presence of an amine crosslinking agent only.

2. A composition as claimed in claim 1 wherein the amount of vinyl halide ranges between about 50% and 95% by weight of the copolymer.

3. A composition as claimed in claim 1 wherein the amount of bis(hydrocarbyl)vinylphosphonate ranges between about 5% and 50% by weight.

4. A composition as claimed in claim 1 wherein the vinyl halide is selected from the group consisting of vinyl chloride and vinyl bromide.

5. A composition as claimed in claim 1 wherein the bis(hydrocarbyl)vinylphosphonate is bis(beta-chloroethyl) vinylphosphonate.

6. A composition as claimed in claim 1 which comprises from about 50% to 95% by weight of vinyl chloride and from about 5% to about 50% of bis(beta-chloroethyl)vinylphosphonate.

7. A process for forming a crosslinked copolymer that consists essentially of a vinyl halide and a bis(hydrocarbyl)vinylphosphonate having the structure

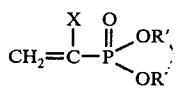

wherein X is selected from the group consisting of hydrogen, halogen, cyano, aryl, haloaryl, $C_1$-$C_{18}$ alkyl, $C_1$-$C_{18}$ haloalkyl and

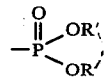

wherein R and R' are hydrocarbyl and substituted hydrocarbyl groups consisting essentially of hydrogen and carbon and containing up to about 18 carbon atoms inclusive with the proviso that R and R' may be the same, different or conjoint, by heating a copolymer of the vinyl halide and vinylphosphonate in the presence of an effective amount for crosslinking of an amine crosslinking agent only, and in the absence of a polyethylenically unsaturated crosslinking monomer.

8. A process as claimed in claim 7 wherein the amount of polyvinyl halide ranges between about 50% and 95% by weight of the copolymer.

9. A process as claimed in claim 7 wherein the amount of bis(hydrocarbyl) vinylphosphonate ranges between about 5% and 50% by weight.

10. A process as claimed in claim 7 wherein the vinyl halide is selected from the group consisting of vinyl chloride and vinyl bromide.

11. A process as claimed in claim 7 wherein the bis(hydrocarbyl)vinylphosphonate is bis(beta-chloroethyl) vinylphosphonate.

12. A process as claimed in claim 7 which comprises from about 50% to 95% by weight of vinyl chloride and from about 5% to about 50% of bis(beta-chloroethyl)-vinylphosphonate.

13. A process as claimed in claim 7 wherein the amount of amine crosslinking agent ranges between about 0.5% and 10% by weight of the copolymer.

14. A process as claimed in claim 7 wherein the copolymer and amine crosslinking agent are heated to a temperature ranging between about 160° C. and 100° C.

15. A process as claimed in claim 7 wherein the amine crosslinking agent is selected from the group consisting of the monoalkyl monoamines, the dialkyl monoamines, the trialkyl monoamines, trialkyl diamines, the dialkyl diamines, the alkyl diamines, the dialkyl triamines, and aliphatic amines having a cyclic chain of from four to six carbon atoms.

* * * * *

UNITED STATES PATENT AND TRADEMARK OFFICE
CERTIFICATE OF CORRECTION

PATENT NO. : 4,078,130
DATED : March 7, 1978
INVENTOR(S) : Jagadish C. Goswami

It is certified that error appears in the above-identified patent and that said Letters Patent are hereby corrected as shown below:

Claim 14, line 3, "100°C" should be -- 180°C. --.

Signed and Sealed this

Eighth Day of August 1978

[SEAL]

Attest:

RUTH C. MASON
Attesting Officer

DONALD W. BANNER
Commissioner of Patents and Trademarks